US011913537B2

(12) United States Patent
Werth

(10) Patent No.: US 11,913,537 B2
(45) Date of Patent: Feb. 27, 2024

(54) CVT BELT COOLING SYSTEM

(71) Applicant: Kris Werth, Inc., Reddick, IL (US)

(72) Inventor: Kristoffer Charles Werth, Reddick, IL (US)

(73) Assignee: Kris Werth, Inc., Reddick, IL (US)

( * ) Notice: Subject to any disclaimer, the term of this patent is extended or adjusted under 35 U.S.C. 154(b) by 0 days.

(21) Appl. No.: 18/155,821

(22) Filed: Jan. 18, 2023

(65) Prior Publication Data
US 2023/0287976 A1  Sep. 14, 2023

Related U.S. Application Data

(60) Provisional application No. 63/300,534, filed on Jan. 18, 2022.

(51) Int. Cl.
| | | |
|---|---|---|
| *F16H 57/04* | (2010.01) | |
| *H02K 9/06* | (2006.01) | |
| *H02K 11/25* | (2016.01) | |
| *F16H 57/02* | (2012.01) | |
| *F16H 9/04* | (2006.01) | |

(52) U.S. Cl.
CPC ..... *F16H 57/0489* (2013.01); *F16H 57/0416* (2013.01); *H02K 9/06* (2013.01); *H02K 11/25* (2016.01); *F16H 9/04* (2013.01); *F16H 2057/02026* (2013.01); *F16H 2057/02034* (2013.01); *F16H 2057/02043* (2013.01)

(58) Field of Classification Search
CPC ............... F16H 57/0489; F16H 57/035; F16H 57/0416; F16H 57/0415; F16H 57/0412; F16H 9/04; H02K 9/06
USPC .................................................. 474/93, 144
See application file for complete search history.

(56) References Cited

U.S. PATENT DOCUMENTS

| | | | | |
|---|---|---|---|---|
| 4,708,699 | A * | 11/1987 | Takano ............... | F16H 57/0006 474/93 |
| 5,976,044 | A * | 11/1999 | Kuyama ............. | F16H 57/0489 474/146 |
| 10,197,149 | B2 * | 2/2019 | Kuji ..................... | F16H 57/0416 |
| 10,981,448 | B2 * | 4/2021 | Safranski .............. | B62D 63/04 |
| 11,421,780 | B2 * | 8/2022 | Desautel ............... | F16H 61/662 |
| 11,434,981 | B2 * | 9/2022 | Oyama ............... | F16H 57/0416 |
| 2004/0224806 | A1 * | 11/2004 | Chonan ............... | F16H 57/0415 474/93 |
| 2006/0270503 | A1 * | 11/2006 | Suzuki ............... | F16H 57/0415 474/93 |

(Continued)

*Primary Examiner* — Henry Y Liu
(74) *Attorney, Agent, or Firm* — Schmeiser, Olsen & Watts LLP

(57) ABSTRACT

A CVT belt cooling system is provided. The system includes a housing that retains within the housing a variable speed motor and a fan blade coupled to the variable speed motor. The system also includes an integrated microprocessor controller coupled to the housing and electrically coupled to the variable speed motor and coupled to a belt temperature sensor. The housing is configured to couple to a housing of a CVT to provide additional cooling air to the CVT belt. The temperature of a belt of the CVT is determined by the belt temperature sensor and based on the determined temperature, and the integrated microprocessor controller controls the speed of the motor and thereby the speed of the fan to control the amount of additional cooling air flowing into the CVT to cool the belt.

5 Claims, 2 Drawing Sheets

(56) References Cited

U.S. PATENT DOCUMENTS

| | | | |
|---|---|---|---|
| 2010/0167853 A1* | 7/2010 | Morita | F16H 9/18 |
| | | | 474/144 |
| 2012/0289370 A1* | 11/2012 | Yamanishi | B60K 17/08 |
| | | | 474/93 |
| 2014/0067215 A1* | 3/2014 | Wetterlund | G06F 17/00 |
| | | | 701/69 |
| 2015/0024890 A1* | 1/2015 | Eberhardt | F16H 57/031 |
| | | | 474/144 |
| 2016/0061088 A1* | 3/2016 | Minnichsoffer | F01N 11/00 |
| | | | 60/320 |
| 2017/0276234 A1* | 9/2017 | Kuji | F16H 57/0489 |
| 2020/0096090 A1* | 3/2020 | Vestermark | F16H 57/0456 |
| 2021/0079985 A1* | 3/2021 | Oyama | B60K 11/02 |
| 2021/0231211 A1* | 7/2021 | Itoo | B60K 17/08 |
| 2021/0293331 A1* | 9/2021 | Desautel | F16H 57/0412 |
| 2022/0010720 A1* | 1/2022 | Nishiwaki | F01P 5/06 |

\* cited by examiner

CVT BELT COOLING SYSTEM

CROSS REFERENCE TO RELATED APPLICATION

This application claims priority to U.S. Provisional patent application entitled "CVT BELT COOLING SYSTEM," Ser. No. 63/300,534, filed Jan. 18, 2022, the disclosure of which is hereby incorporated entirely herein by reference.

BACKGROUND OF THE INVENTION

Technical Field

This invention relates generally to a CVT belt cooling system and more particularly to a CVT belt cooling system that can be coupled to an existing belt temperature gauge.

State of the Art

Continuously variable transmissions, or "CVTs," are commonly used in cars, tractors, motor scooters, snowmobiles, and off-road vehicles, such as UTVs, side-by-sides and the like. CVTs typically include an input pulley, an output pulley, and a belt, whereby the input pulley turns the belt which in turn turns the output pulley.

In operation, particularly during long periods of use, the belt can reach high temperatures, which can cause the belt to fail or break. A broken belt requires that the belt be replaced in order for the CVT to work properly. This is a common issue that owners of off-road vehicles with a CVT often carry extra belts in order to change them out when they fail. Conventional methods and devices used for cooling belts of CVTs impede and/or restrict airflow within an existing ductwork of the CVT, making them ineffective in cooling the belt.

Accordingly, what is needed is a CVT belt cooling system that can supply additional cooling air to the belt of a CVT without impeding and/or restricting airflow through the existing ductwork of the CVT.

SUMMARY OF THE INVENTION

The present invention relates to a CVT belt cooling system. An embodiment includes a CVT belt cooling system comprising: a variable speed motor; a fan blade coupled to the variable speed motor; an integrated microprocessor controller coupled to the variable speed motor and coupled to a belt temperature sensor; and a housing retaining the variable speed motor and fan blade within the housing and the integrated microprocessor coupled to the housing, wherein the housing is configured to couple to a housing of a CVT to provide additional cooling air to the CVT belt.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a belt cooling system that operates to introduce additional cooling air into a continuously variable transmission, or "CVT," for cooling the CVT and belt.

Figure 1C:
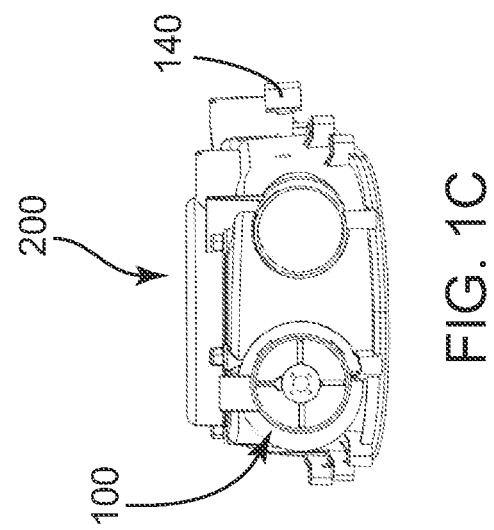
FIG. 1C is an end view of a CVT with a CVT belt cooling system according to an embodiment of the present technology.
Figure 1A:
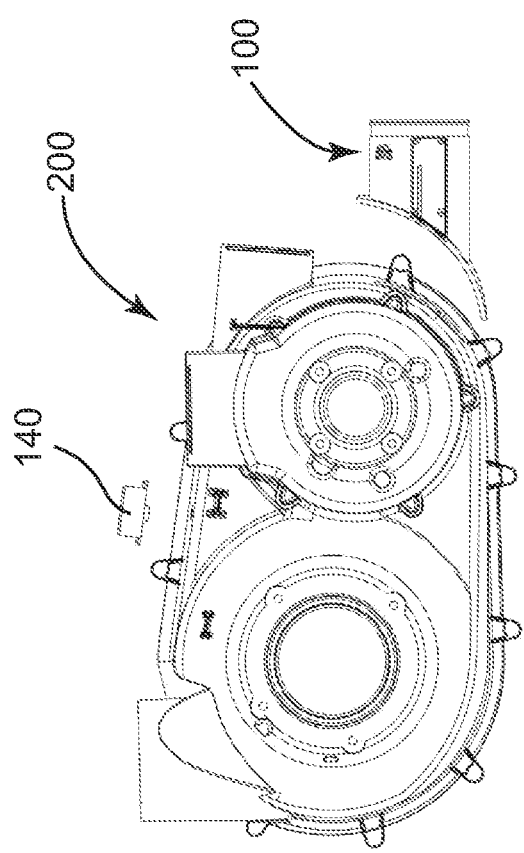
FIG. 1A is side view of a CVT with a CVT belt cooling system according to an embodiment of the present technology.
Figure 1B:
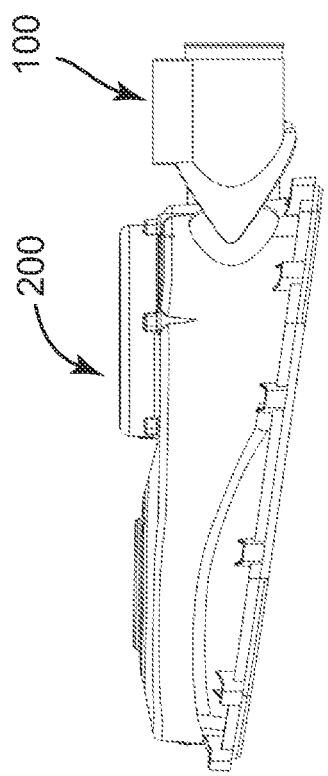
FIG. 1B is a bottom view of a CVT with a CVT belt cooling system according to an embodiment of the present technology.
Figure 2:
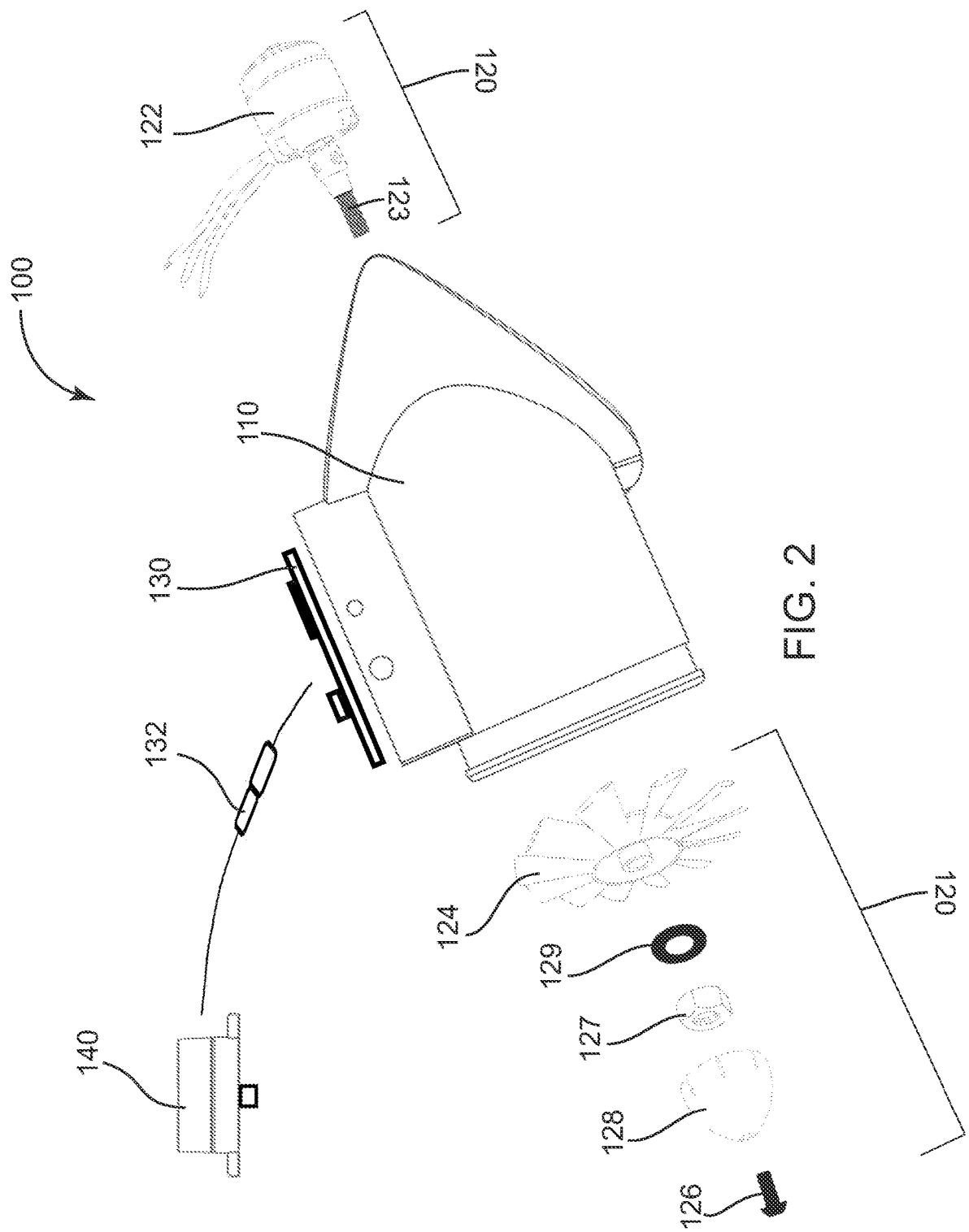
FIG. 2 is a perspective exploded view of a CVT belt cooling system according to an embodiment of the present technology.

Referring to FIGS. 1A-2, in various embodiments, a cooling system 100 may be mounted in an auxiliary position on an original equipment manufacturer ("OEM") or CVT housing 200 that is not in-line with an existing ductwork (not shown) of the CVT. In this regard, the cooling system 100 may supplying additional cooling air to a belt (not shown) of the CVT with the advantage of not restricting airflow through the existing ductwork of the CVT. The cooling system 100 may comprise a housing 110, a motor assembly 120, a microprocessor controller 130, and a temperature sensor 140.

The motor assembly 120 may comprise a variable speed motor 122, a fan blade 124, a retaining bolt 126, a nut 127, an end cap or nose cone 128, and a washer 129. The retaining pin 126 may be configured to retain the fan blade 124 within the housing 110, whereby the retaining pin 126 may extend through the end cap or nose cone 128 to hold the fan blade 124 in an operable position within the housing 110. The fan blade 124 may be coupled to a shaft 123 of the variable speed motor 122 by inserting the shaft 123 through an aperture (not shown) of the fan blade 124 and securing the shaft 123 to the fan blade 124 utilizing the retaining bolt 126, nut 127, end cap or nose cone 128, and washer 129. In this regard, the variable speed motor 122 may be coupled to the fan blade 124 such that the fan blade 124 may rotate in unison with the shaft 123 of the variable speed motor 122.

The retaining pin 126 and nose cone or end cap 128 may be pressed towards the nut 127, and the nut 127 may be positioned against the washer 129, which be disposed between the fan blade 124 and the nut 127. The shaft 123 may be received in the nut 127, and external threads of the shaft 123 may be in mating engagement with corresponding threads formed on an inside of a circular edge of the nut 127. The internal threads on the inside of the nut 127 may be formed spirally and circumferentially on the nut 127.

In one embodiment, the microprocessor controller 130 may be integrated within the housing 110. In another embodiment, the microprocessor controller 130 may be coupled to the housing 110. The microprocessor controller 130 may be electrically coupled to the variable speed motor 122. Additionally, the microprocessor controller 130 may be coupled to the temperature sensor 140 through a wiring connector assembly 132. The microprocessor controller 130 may be configured to read a plurality of temperature information received from the temperature sensor 140 and controllably operate a speed of the belt according to the temperature information.

For example, and without limitation, as the temperature of the belt increases as determined by the temperature sensor 140, the microprocessor controller 130 may control the speed of the variable speed motor 122 and increase its speed as the temperature of the belt increases, thereby rotating the fan blade 124 at a higher rate and providing increased additional cooling air into the OEM housing 200 for cooling the belt. Similarly, as the temperature decreases, the microprocessor controller 130 may control the speed of the variable speed motor 122 and decrease its speed as the temperature of the belt decreases, thereby rotating the fan blade 124 at a lower rate as the belt temperature decreases.

The microprocessor controller 130 may comprise logic circuitry (not shown) for receiving various inputs and providing a plurality of control signals, i.e., enable and disable signals, to various components of the cooling system 100. The control circuitry may be implemented using a variety of different logic components, processors, associated configuration data and/or stored programming instructions. In some embodiments, the microprocessor controller 130 may have programming instructions that controls the speed of the variable speed motor 122 to operate at a certain speed corresponding to a certain temperature reading of the temperature sensor 140. In this way as the temperature changes up and down the speed of the variable speed motor 122 changes up and down so that a particular speed of the fan blade 124 corresponds to a particular belt temperature reading.

The temperature sensor 140 may comprise an infrared temperature sensor. In one embodiment, the temperature sensor 140 may be a part of the CVT. In another embodiment, the temperature sensor 140 may be a separate component that is integrated within the housing 110 of the cooling system 100.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A cooling system for use with a continuously variable transmission (CVT) having a CVT housing and a belt, comprising:
   a variable speed motor;
   a fan blade coupled to the variable speed motor;
   a temperature sensor;
   a microprocessor controller coupled to the variable speed motor and coupled to the temperature sensor; and
   a housing retaining the variable speed motor and the fan blade within the housing,
   wherein the microprocessor is coupled to the housing, and wherein the housing is configured to couple to the CVT housing to provide additional cooling air to the belt.

2. The cooling system of claim 1, wherein the housing is mounted in an auxiliary position on the CVT housing, and wherein the housing provides additional cooling air to the belt without restricting airflow through an existing ductwork of the CVT.

3. The cooling system of claim 1, wherein the microprocessor is integrated within the housing.

4. The cooling system of claim 1, wherein:
   the temperature sensor is configured to measure a temperature of the belt;
   the microprocessor is configured to read the measured temperature of the belt and controllably operate a speed of the variable speed motor according to the measured temperature; and
   the fan blade rotates in unison with the variable speed motor.

5. The cooling system of claim 1, wherein the temperature sensor is an infrared temperature sensor.

* * * * *